(12) United States Patent
Matsubara

(10) Patent No.: US 7,758,192 B2
(45) Date of Patent: Jul. 20, 2010

(54) LIGHTING DEVICE AND PROJECTOR

(75) Inventor: Takayuki Matsubara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 519 days.

(21) Appl. No.: 11/867,431

(22) Filed: Oct. 4, 2007

(65) Prior Publication Data

US 2008/0123056 A1 May 29, 2008

(30) Foreign Application Priority Data

Nov. 27, 2006 (JP) ............................. 2006-318113

(51) Int. Cl.
*G03B 21/14* (2006.01)
*G03B 21/00* (2006.01)
*G03B 21/28* (2006.01)

(52) U.S. Cl. ............................. 353/20; 353/31; 353/81; 353/98

(58) Field of Classification Search .................... 353/20, 353/30, 31, 38, 81, 94, 98; 362/19, 259
See application file for complete search history.

(56) References Cited

U.S. PATENT DOCUMENTS 4,619,508 A   10/1986   Shibuya et al.

6,517,211 B2 *   2/2003   Mihara ........................ 353/98

FOREIGN PATENT DOCUMENTS

| JP | A 60-230629 | 11/1985 |
| JP | A 5-196869 | 8/1993 |
| JP | A 7-297111 | 11/1995 |
| JP | A 2000-199872 | 7/2000 |
| JP | A 2001-296503 | 10/2001 |

* cited by examiner

*Primary Examiner*—Georgia Y Epps
*Assistant Examiner*—Danell L Owens
(74) *Attorney, Agent, or Firm*—Oliff & Berridge, PLC

(57) ABSTRACT

A lighting device includes: a light source unit which supplies coherent light; a polarized light splitting unit which reflects first polarized light having first oscillation direction and transmits second polarized light having second oscillation direction substantially orthogonal to the first oscillation direction to split the first polarized light from the second polarized light; a reflection unit which reflects light advancing in a direction other than the lighting direction from the polarized light splitting unit; a partial reflection unit disposed between the polarized light splitting unit and the reflection unit to transmit a part of entering light and reflect the other part of the entering light; and a wavelength plate disposed between the polarized light splitting unit and the partial reflection unit to vary polarization condition of entering light.

9 Claims, 6 Drawing Sheets

LIGHTING DEVICE AND PROJECTOR

BACKGROUND

1. Technical Field

The present invention relates to a lighting device and a projector, and particularly to a technology of a lighting device which uses laser beams.

2. Related Art

When laser beams as coherent lights are applied to a diffusing surface, coherent patterns called speckle noise containing randomly distributed bright points and dark points appear in some cases. The speckle noise is caused by random coherences between diffused lights at respective points on the diffusing surface. The speckle noise recognized during display of an image has undesirable effect on the image to be displayed, since the audience is dazzled by flickering light produced by the speckle noise. Technologies for reducing the speckle noise have been proposed in JP-A-7-297111 and JP-A-5-196869, for example. According to the technology disclosed in JP-A-7-297111, speckle patterns are varied by rotating a diffusion plate provided on an optical path at high speed. In this case, a particular speckle pattern cannot be easily recognized by superposing a plurality of speckle patterns. According to the technology disclosed in JP-A-5-196869, lights reciprocate between a reflection mirror and a partial reflection mirror disposed substantially in parallel with each other so that lights having passed through different optical path lengths can be emitted. In this technique, light coherence is decreased by emitting light having optical path difference corresponding to coherent length.

In case of the structure having the diffusing plate on the optical path, light loss is produced by diffusion of light on the diffusion plate. Additionally, since the relatively large-sized diffusing plate is rotated at high speed in the technology disclosed in JP-A-7-297111, power consumption and driving noise also increase. It is thus difficult to use the technology of the high-speed rotation diffusing plate particularly for private use equipment without any improvement. In case of the technology disclosed in JP-A-5-196869, light entering with inclination to the perpendicular of the mirrors reciprocates between the two mirrors while advancing obliquely. In this case, light is split while advancing obliquely between the two mirrors, and the light emission range increases as splitting of light proceeds. When the light emission range is large, the overall size of the apparatus using illumination light needs to be increased. Particularly, while the speckle noise effectively decreases with increase in the number of light divisions, the size of the structure enlarges. Various structures for emitting light having optical path difference have been proposed other than the structure disclosed in JP-A-5-196869. Examples of these structures involve a structure using fly-eye lenses of different lengths (see JP-A-60-230629), a structure using a step-type reflection mirror (JP-A-2000-199872), a structure using units of beam splitter and prism disposed in parallel (see JP-A-2001-296503), a structure using a fiber bundle, and other structures. In any of these structures, addition or enlargement of optical device is necessary as the number of light divisions increases. In this case, both the advantages of effective reduction of speckle noise and miniaturization of the structure are difficult to achieve at a time. According to the technologies in the related art, therefore, reduction of speckle noise by using a compact structure is difficult.

SUMMARY

It is an advantage of some aspects of the invention no provide a lighting device capable of effectively reducing speckle noise by using a compact structure, and a projector including this lighting device.

A lighting device according to a first aspect of the invention includes: a light source unit which supplies coherent light; a polarized light splitting unit which reflects first polarized light having first oscillation direction and transmits second polarized light having second oscillation direction substantially orthogonal to the first oscillation direction to split the first polarized light from the second polarized light; a reflection unit which reflects light advancing in a direction other than the particular lighting direction from the polarized light splitting unit; a partial reflection unit disposed between the polarized light splitting unit and the reflection unit to transmit a part of entering light and reflect the other part of the entering light; and a wavelength plate disposed between the polarized light splitting unit and the partial reflection unit to vary polarization condition of entering light. The partial reflection unit and the reflection unit produce optical path difference between light which passes through the partial reflection unit and the polarized light splitting unit to be released in the lighting direction and light which sequentially passes through the partial reflection unit, the reflection unit, the partial reflection unit, and the polarized light splitting unit to be released in the lighting direction.

Since the partial reflection unit is provided between the polarized light splitting unit and the reflection unit, light entering from the polarized light splitting unit to the partial reflection unit is split from light entering from the reflection unit to the partial reflection unit. In this case, optical path difference is produced between light directly released in the lighting direction from the partial reflection unit and light released in the lighting direction after traveling from the partial reflection unit to the reflection unit. Thus, light coherence can be reduced. According to this aspect of the invention, the number of light divisions is determined according to transmissivity and reflectivity of the partial reflection unit. Thus, the number of light divisions can be increased in a compact structure. Since each of the split lights is emitted from the exit face of the polarized light splitting unit, effective reduction of speckle noise and decrease in the widened lighting area can be achieved. Accordingly, the lighting device can effectively reduce speckle noise by a compact structure.

In this aspect of the invention, it is preferable that the polarized light splitting unit and the reflection unit are disposed with a distance corresponding to half of a coherent length of the coherent light or longer between the partial reflection unit and the reflection unit. According to this structure, light having optical path difference corresponding to the coherent length can be emitted. Thus, the speckle noise can be further effectively reduced.

In this aspect of the invention, it is preferable that the polarized light splitting unit and the reflection unit are disposed on a common optical axis. The enlarged light emission area can be further decreased by directing light to advance along the optical axis. Since the light advancing area is also narrowed, the entire size of the lighting device can be reduced. Accordingly, the structure can be made further compact, and the enlarged lighting area can be reduced.

In this aspect of the invention, it is preferable to further include a light guide unit through which light propagates between the partial reflection unit and the reflection unit. According to this structure, the loss of light propagating between the partial reflection unit and the reflection unit can be reduced.

In this aspect of the invention, it is preferable that the light guide unit has a rod integrator. According to this structure, light can propagate within the rod integrator.

In this aspect of the invention, it is preferable to further include a variable refractive index element which transmits light propagating between the partial reflection unit and the reflection unit and varies refractive index. According to this structure, it is possible to further vary the optical path difference of light propagating between the partial reflection unit and the reflection unit by changing refractive index using the variable refractive index element. Accordingly, the speckle noise can be further effectively reduced.

In this aspect of the invention, it is preferable to further include the plural partial reflection units. According to the structure having the plural partial reflection units, it is also possible to level intensities of lights. Thus, the speckle noise can be further effectively reduced.

In this aspect of the invention, it is preferable that the reflection unit has a prism unit which reflects light with total reflection. According to the structure having the prism unit, it is possible to reflect light released from the polarized light splitting unit and advancing in a direction other than the particular lighting direction. In this case, the loss of light caused by reflection can be reduced by total reflection of light. Accordingly, the lighting device can emit light with high efficiency.

A projector according to a second aspect of the invention includes: the lighting device described above; and a spatial light modulating unit which modulates light; emitted from the lighting device according to an image signal. The projector including the above lighting device can effectively reduce speckle noise by a compact structure. Accordingly, the projector can display a high-quality image with reduced speckle noise by a compact structure.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Embodiments according to the invention are now described in detail with reference to the appended drawings.

First Embodiment

Figure 1:
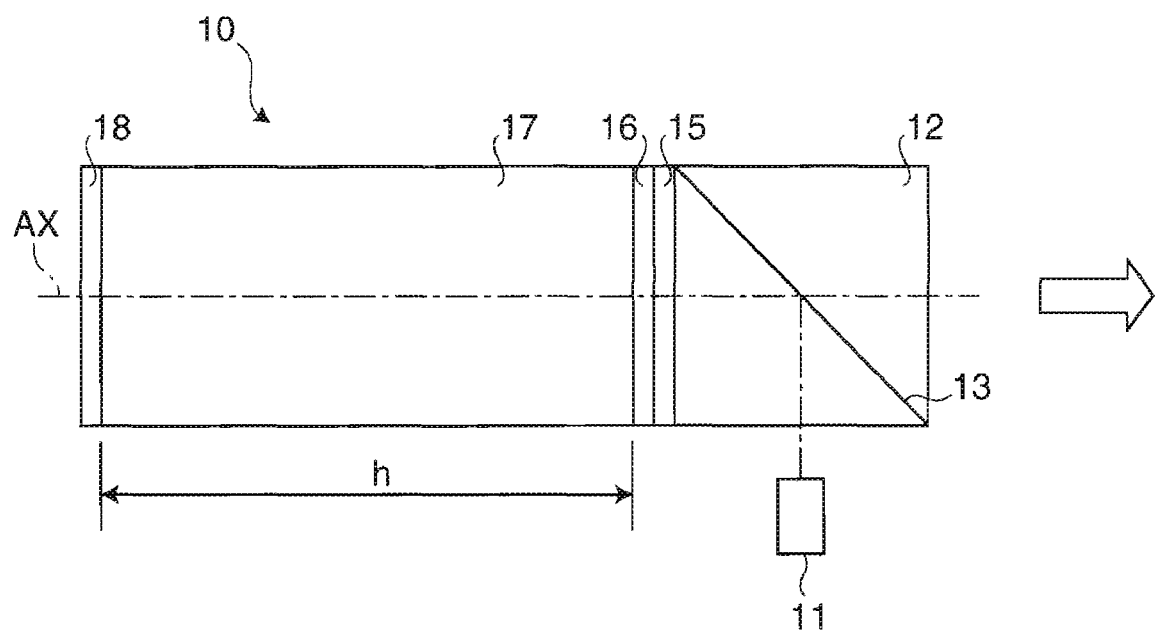
FIG. 1 schematically illustrates a structure of a lighting device according to a first embodiment of the invention.

FIG. 1 schematically illustrates a structure of a lighting device 10 in a first embodiment according to the invention. The lighting device 10 emits light in a lighting direction shown by a white arrow in the figure. A light source unit 11 is disposed in a direction substantially orthogonal to the lighting direction. The light source unit 11 supplies laser beam as coherent light. The laser beam supplied from the light source unit 11 is s-polarized light, for example. The s-polarized light is a first polarized light having a first oscillation direction. Examples of lasers supplied from the light source unit 11 involve semiconductor laser, diode-pumped solid-state (DPSS) laser, solid laser, liquid laser, gas laser, and other lasers. A wavelength converting element which converts the wavelength of the laser light, such as a second-harmonic generation (SHG) element may be included in the light source unit 11.

A polarized beam splitter 12 is disposed at a position to which the laser beam from the light source unit 11 enters. The polarized beam splitter 12 is formed by combining two rectangular prisms. A dielectric multilayer film 13 is coated on the affixed surfaces of the two rectangular prisms. The polarized beam splitter 12 is a polarized light splitting unit splits s-polarized light from p-polarized light by reflecting s-polarized light and transmitting p-polarized light on the dielectric multilayer film 13. This p-polarized light is a second polarized light having a second oscillation direction substantially orthogonal to the first oscillation direction. The entrance surface and the exit surface of the polarized beam splitter 12 may be coated with anti-reflection coating (AR coating).

Components of a ¼ wavelength plate 15, a partial reflection mirror 16, a rod integrator 17, and a reflection mirror 18 are provided on the side opposite to the lighting direction as viewed from the polarized beam splitter 12. The respective components from the polarized beam splitter 12 to the reflection mirrors 18 are disposed on a common optical axis AX. The polarized beam splitter 12 is positioned such that the dielectric multilayer film 13 is inclined approximately 45 degrees to the optical axis AX. The partial reflection mirror 16 is disposed between the polarized beam splitter 12 and the reflection mirror 18. The ¼ wavelength plate 15 is located between the polarized beam splitter 12 and the partial reflection mirror 16. The rod integrator 17 is positioned between the partial reflection mirror 16 and the reflection mirror 18.

The ¼ wavelength plate 15 is a wavelength plate which produces phase difference of 90 degrees ($\pi/2$) between p-polarized light and s-polarized light, and changes the polarization condition of entering light from linear polarized light to circular polarized light or from circular polarized light to linear polarized light. The ¼ wavelength plate 15 is disposed such that the optical axis is inclined 45 degrees to the polarization axis of linear polarized light. The partial reflection mirror 16 is a partial reflection unit which transmits a part of entering light and reflects the other part of the entering light. For example, the partial reflection mirror 16 is a half mirror which transmits 50% of entering light and reflects the remaining 50% of the entering light. The partial reflection mirror 16 is formed by providing dielectric multilayer film on a parallel flat plate made of transparent material such as glass.

The rod integrator 17 is a light guide unit through which light can propagate between the partial reflection mirror 16 and the reflection mirror 18. The rod integrator 17 has a columnar body made of transparent material such as glass and resin. Light propagates through the rod integrator 17 while reflected with total reflection on the interface between the transparent material and the air. The loss of light traveling between the partial reflection mirror 16 and the reflection mirror 18 can be prevented by changing the direction of light advancing away from the optical axis AX to the direction corresponding to the optical axis AX. A length h of the rod integrator 17 in the direction of the optical axis AX corresponds to half of coherent length of the laser beam emitted from the light source unit 11.

While the rod integrator 17 is a columnar body made of transparent material in this embodiment, the rod integrator 17 may be a hollow cylindrical member made of reflective material. The reflective material may be metal material such as aluminum, a dielectric multilayer, and other materials. In this case, light can similarly propagate by reflection on the reflective material. When the loss of light between the partial reflection mirror 16 and the reflection mirror 18 is little, the rod integrator 17 can be eliminated. Particularly when the laser beam from the light source unit 11 has high directivity and thus scarcely causes diffsion on the optical path, the rod integrator 17 can be eliminated. In this case, the partial reflection mirror 16 and the reflection mirror 18 are disposed with a distance corresponding to half of the coherent length between each other.

Since the rod integrator 17 having the length h is provided, the partial reflection mirror 16 and the reflection mirror 18 are disposed with the distance corresponding to half of the coherent length of the laser beam between each other. The reflection mirror 18 is a reflection unit which reflects light advancing in the direction opposite to the lighting direction from the polarized beam splitter 12 and passing through the respective components from the polarized beam splitter 12 to the reflection mirror 18 so that the light can be directed in the lighting direction. The reflection mirror 18 is constituted by a parallel flat plate coated with highly reflective material such as aluminum or other metal film and dielectric multilayer film.

Figure 2:
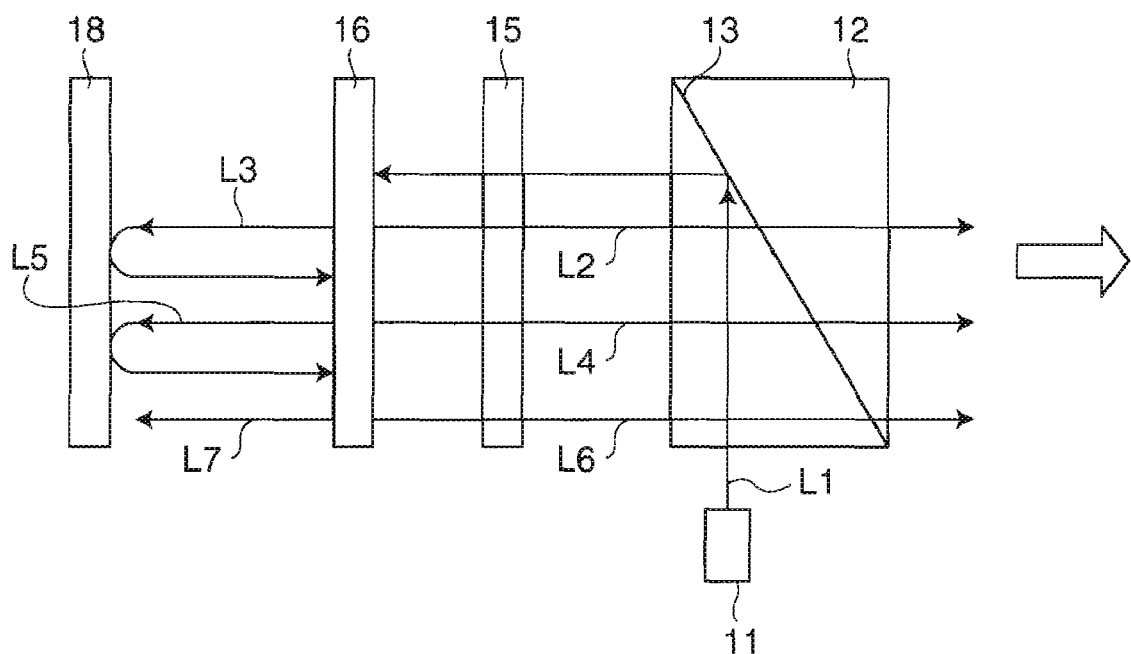
FIG. 2 schematically shows action of light in the lighting device.

FIG. 2 schematically illustrates action of light in the lighting device 10. In this figure, components unnecessary for explanation are not shown it is assumed that the intensity of the laser beam means that laser beam L1 emitted from the light source unit 11 has 100% intensity. The laser beam L1 advances in the direction substantially orthogonal to the optical axis AX from the light source unit 11, and enters the polarized beam splitter 12. The laser beam L1 as s-polarized light is bent approximately 90 degrees by reflection on the dielectric multilayer film 13 of the polarized beam splitter 12. The laser beam L1 bent about 90 degrees travels along the optical axis AX in the direction opposite to the lighting direction, and enters the ¼ wavelength plate 15. The laser beam L1 as s-polarized light passes through the ¼ wavelength plate 15 to be converted into circular polarized light.

The laser beam L1 converted into circular polarized light by the ¼ wavelength plate 15 enters the partial reflection mirror 16. The partial reflection mirror 16 reflects laser beam L2 having 50% intensity in the laser beam L1 having 100% intensity, and transmits laser beam L3 having 50% intensity. The laser beam L2 reflected by the partial reflection mirror 16 advances in the lighting direction as the direction opposite to the previous traveling direction and again enters the ¼ wavelength plate 15. The laser beam L2 as circular polarized light passes through the ¼ wavelength plate 15 to be converted into p-polarized light. The laser beam L2 converted Into p-polarized light passes through the dielectric multilayer film 13 of the polarized beam splitter 12 to be released in the lighting direction.

The laser beam L3 having passed through the partial reflection mirror 16 in the laser beam L1 advances in the same direction as the previous advancing direction, and enters the reflection mirror 18. Then, the laser beam L3 travels in the lighting direction opposite to the previous advancing direction by reflection on the reflection mirror 18, and again enters the partial reflection mirror 16. The partial reflection mirror 16 reflects laser beam L5 having 25% intensity in the laser beam L3 having 50% intensity, and transmits laser beam L4 having 25% intensity. The laser beam L4 having passed through the partial reflection mirror 16 is converted into p-polarized light by the ¼ wavelength plate 15 to be released to the lighting direction.

The laser beam L2 initially divided by the partial reflection mirror 16 passes through the partial reflection mirror 16 and the polarized beam splitter 12 to be released in the lighting direction. The laser beam L4 divided second sequentially passes through the partial reflection mirror 16, the reflection mirror 18, the partial reflection mirror 16, and the polarized beam splitter 12 to be released in the lighting direction. The laser beam L4 which passes through the reflection mirror 18 travels longer optical path than that of the laser beam L2 which is not reflected by the reflection mirror 18 by a length corresponding to twice the length between the partial reflection mirror 16 and the reflection mirror 18. Since the rod integrator 17 having the length h corresponding to half of the coherent length is provided between the partial reflection mirror 16 and the reflection mirror 18 (see FIG. 1), optical path difference corresponding to the coherent length is produced between the laser beams L2 and L4.

The laser beam L5 reflected by the partial reflection mirror 16 in the laser beam L3 is reflected by the reflection mirror 18, and enters the partial reflection mirror 16. The partial reflection mirror 16 reflects laser beam L7 having 12.5% intensity of the laser beam L5 having 25% intensity, and transmits laser beam L6 having 12.5% intensity. The laser beam L6 having passed through the partial reflection mirror 16 is converted into p-polarized light by the ¼ wavelength plate 15 to be released in the lighting direction. Optical path difference corresponding to the coherent length is similarly produced between the laser beam L4 divided second and the laser beam L6 divided third by the partial reflection mirror 16. The laser beam L7 reflected by the partial reflection mirror 16 in the laser beam L5 repeatedly reciprocates in the manner described above.

The lighting device 10 reduces light coherence by emitting light which, has optical path difference corresponding to the coherent length by this method. The number of light divisions by using the partial reflection mirror 16 can be determined according to the transmissivity and reflectivity of the partial reflection mirror 16, and therefore the division number of the light can be increased even in a small structure. Each of the divided lights is released from the exit face of the polarized beam splitter 12. Thus, effective speckle noise reduction and decrease in the widened lighting area can be achieved.

The expansion of the lighting area can be further reduced by guiding the advancing direction of the laser beam such that the laser beam can travel along the optical axis AX. Since the laser beam advancing area is also narrowed, the overall structure of the lighting device 10 can be made compact. Accordingly, the advantage of effectively reducing speckle noise by a compact structure can be offered. The lighting device 10 according to this embodiment capable of supplying linear polarized light in a particular oscillation direction is particularly useful when combined with a liquid crystal display device. The partial reflection mirror 16 is not limited to a half mirror. The partial reflection mirror 16 may be a light control mirror for which transmissivity and reflectivity are appropriately established. The intensities of lights emitted from the lighting device 10 can be appropriately determined according to the transmissivity and reflectivity of the partial reflection mirror 16. The partial reflection mirror 16 can be so constructed as to have transmissivity and reflectivity corresponding to the wavelength of the laser beam emitted from the light source unit 11.

The distance between the partial reflection mirror 16 and the reflection mirror 18 is not limited to the length corresponding to half of the coherent length of the laser beam, but may be a length larger than half of the coherent length. In this case, laser beam having optical path difference corresponding to a length larger than the coherent length can be emitted. The speckle noise can be more effectively reduced as the distance between the partial reflection mirror 16 and the reflection mirror 18 increases.

The distance between the partial reflection mirror 16 and the reflection mirror 18 may be a length shorter than half of the coherent length when reduction of the speckle noise is achievable. In this case, the speckle noise can be reduced by emitting laser beam having optical path difference corresponding to equivalent to or larger than coherent length produced by reciprocating the laser beam several times between the partial reflection mirror 16 and the reflection mirror 18. It is also an advantage that the lighting device 10 can be made compact by decreasing the distance between the partial reflection mirror 16 and the reflection mirror S8. Polarized light supplied from the light source device 11 is not limited to s-polarized light but may be p-polarized light. In this case, the polarized beam splitter 12 reflects p-polarized light as the first polarized light and releases s-polar-zed light as the second polarized light. The lighting device 10 emits s-polarized light in the lighting direction.

Figure 3:
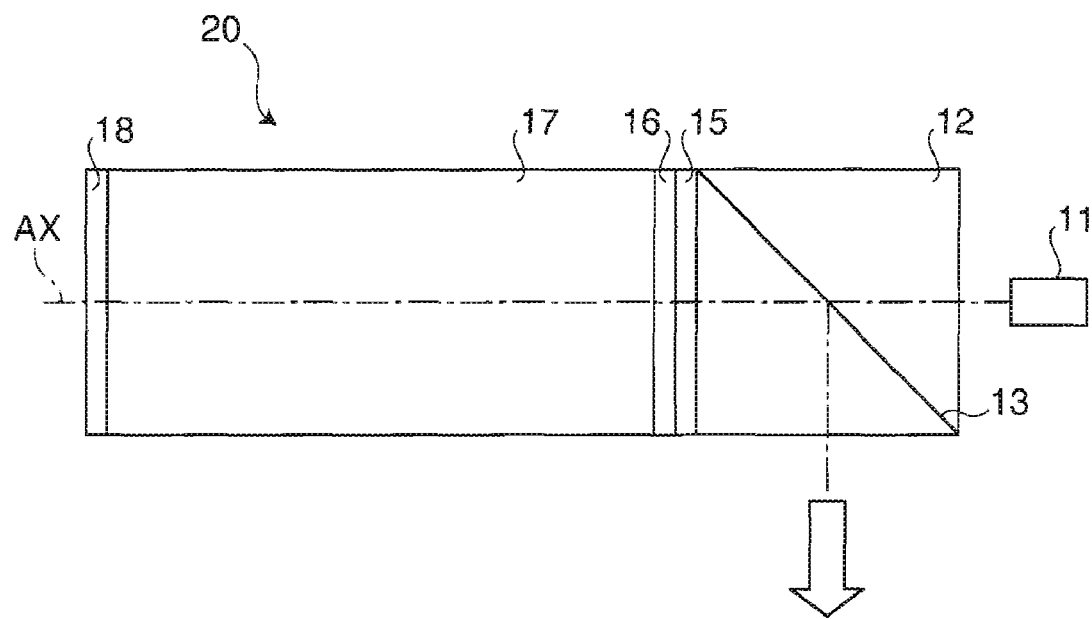
FIG. 3 schematically illustrates a structure of a lighting device according to a modified example 1 in the first embodiment.

FIG. 3 schematically illustrates a structure of a lighting device 20 in a modified example 1 in the first embodiment. The lighting device 20 in this modified example emits light in the lighting direction substantially orthogonal to the optical axis AX. The light source unit 11 of the lighting device 20 is provided on the optical axis AX. The light source unit 11 supplies p-polarized light, for example, along the optical axis AX. The polarized beam splitter 12 reflects s-polarized light as the first polarized light and transmits p-polarized light as the second polarized light. The p-polarized light emitted from the light source unit 11 passes through the polarized beam splitter 12. The p-polarized light having passed through the polarized beam splitter 12 is converted into circular polarized light by the ¼ wavelength plate 15.

The circular polarized light reflected by the partial reflection mirror 16 or the reflection mirror 18 enters the ¼ wavelength plate 15 to be converted into s-polarized light. The s-polarized light having entered the polarized beam splitter 12 from the ¼ wavelength plate 15 is bent approximately 90 degrees by reflection on the dielectric multilayer film 13. The laser beam bent about 90 degrees advances in the lighting direction. In this case, the speckle noise can be effectively reduced by a small structure in the similar manner.

Figure 4:
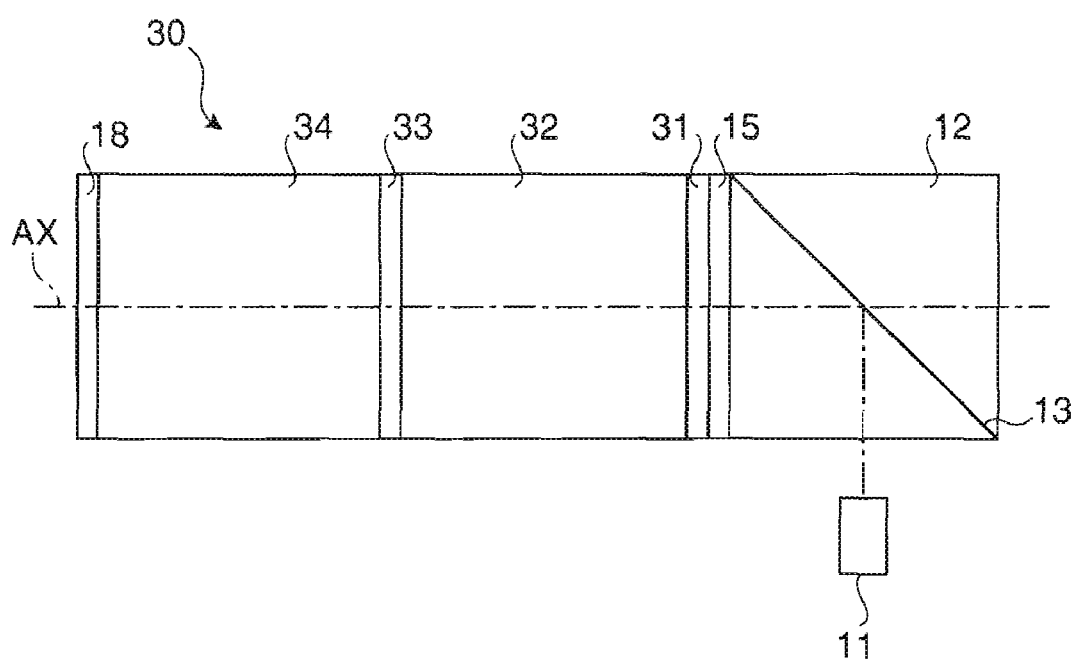
FIG. 4 schematically illustrates a structure of a lighting device according to a modified example 2 in the first embodiment.

FIG. 4 schematically illustrates a structure of a lighting device 30 in a modified example 2 in this embodiment. The lighting device 30 in this modified example includes two partial reflection mirrors 31 and 33. The first and second partial reflection mirrors and 33 are partial reflection units which transmit a part of entering light and reflect the other part of the entering light. The first partial reflection mirror 31 is disposed at the same position as that of the partial reflection mirror 16 (see FIG. 1) in the lighting device 10 described above. The first partial reflection mirror 31 transmits 90% of entering light and reflects remaining 10% of the entering light, for example.

A first rod integrator 32, the second partial reflection mirror 33, and a second rod integrator 34 are disposed between the first partial reflection mirror 31 and the reflection mirror 18. The second partial reflection mirror 33 is positioned between the first rod integrator 32 and the second rod integrator 34. The second partial reflection mirror 33 is a half mirror which transmits 50% of entering light and reflects the remaining 50% of the entering light, for example.

The first rod integrator 32 and the second rod integrator 34 are light guide units through which light can propagate between the first partial reflection mirror 31 and the reflection mirror 18. Each of the first and second rod integrators 32 and 34 may have a columnar body made of transparent material such as glass, or a hollow cylindrical member made of reflective material. Each of the first and second rod integrators 32 and 34 has a length corresponding to half of the coherent length.

Figure 5:
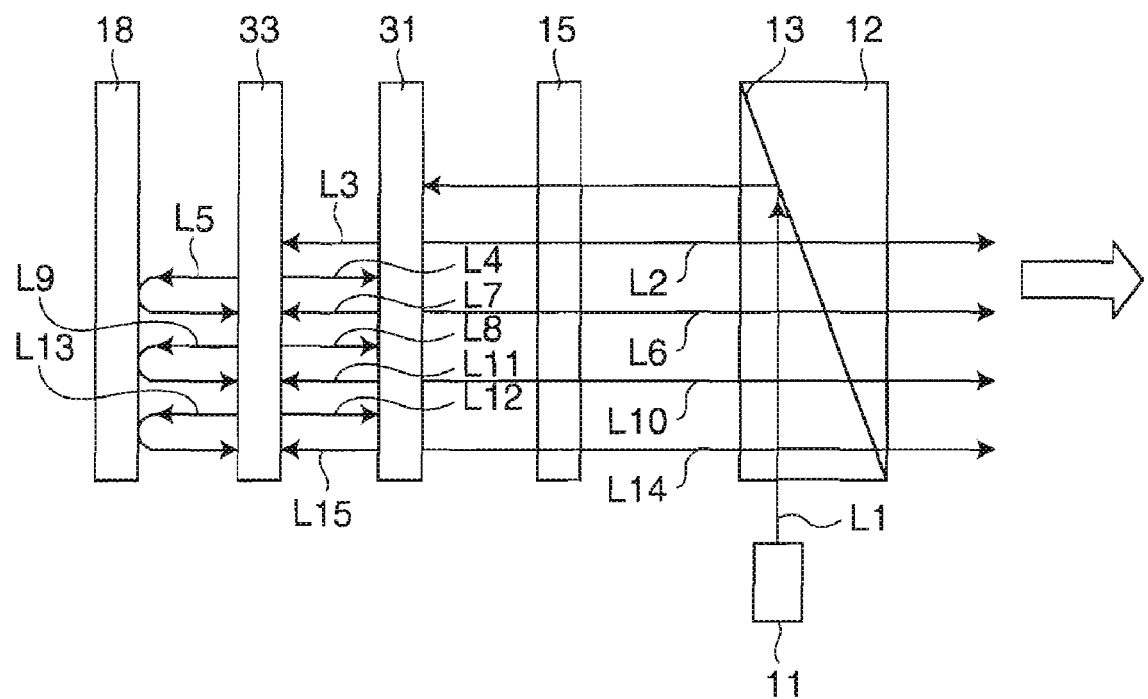
FIG. 5 schematically shows action of light in the lighting device.

FIG. 5 schematically shows action of light in the lighting device 30. The first partial reflection mirror 31 reflects laser beam L2 having 10% intensity in laser beam L1 having 100% intensity released from the polarized beam splitter 12, and transmits laser beam L3 having intensity 90%. The laser beam L2 reflected by the first partial reflection mirror 31 is converted into p-polarized light, and released in the lighting direction. The laser beam L3 having passed through the first partial reflection mirror 31 enters the second partial reflection mirror 33.

The second partial reflection mirror 33 reflects laser beam L4 having 45% intensity in the laser beam L3 having 90% Q intensity, and transmits laser beam L5 having intensity 45%. The laser beam L4 reflected by the second partial reflection mirror 33 enters the first partial reflection mirror 31. The first partial reflection mirror 31 transmits laser beam L6 having 40.5% intensity (=45%×0.9) in the laser beam L4 having 45% intensity, and reflects laser beam L7 having intensity 4.5% intensity (=45%×0.1). The laser beam L6 having passed through the first partial reflection mirror 31 is converted into p-polarized light, and released in the lighting direction. The laser beam L7 reflected by the first partial reflection mirror 31 repeatedly reciprocates in the manner described above.

The laser beam L5 having passed through the second partial reflection mirror 33 is reflected by the reflection mirror 18, and enters the second partial reflection mirror 33. The second partial reflection mirror 33 transmits laser beam L8 having 22.5% intensity (=45%×0.5) in the laser beam L5 having intensity 45% intensity, and reflects laser beam L9 having 22.5% intensity. The laser beam L8 having passed through the second partial reflection mirror 33 enters the first partial reflection mirror 31. The first partial reflection mirror 31 transmits laser beam L10 having 20.25% intensity (=22.5%×0.9) in the laser beam L8 having 22.5% intensity, and reflects laser beam L11 having 2.25% intensity (=22.5%×0.1). The laser beam L10 having passed through the first partial reflection mirror 31 is converted into p-polarized light, and is released in the lighting direction. The laser beam L11 reflected by the first partial reflection mirror 31 repeatedly reciprocates in the manner described above.

The laser beam L9 reflected by the second partial reflection mirror 33 is further reflected by the reflection mirror 18, and enters the second partial reflection mirror 33. The second partial reflection mirror 33 transmits laser beam L12 having 11.25% intensity (=22.5%×0.5) in the laser beam L9 having 22.5% intensity, and reflects laser beam L13 having 11.25% intensity. The laser beam L12 having passed through the second partial reflection mirror 33 enters the first partial reflection mirror 31. The first partial reflection mirror 31 transmits laser beam L14 having 10.125% intensity (=11.25%×0.9) in the laser beam L12 having 11.25% intensity and reflects laser beam L15 having 1.125% (=11.25%× 0.1) intensity. The laser beam L14 having passed through the first partial reflection mirror 31 is converted into p-polarized light, and is released in the lighting direction. The laser beam L13 reflected by the second partial reflection mirror 33 and the laser beam L15 reflected by the first partial reflection mirror 31 repeatedly reciprocate in the manner described above.

In the lighting device 10, intensities of the emitted laser beams are reduced to half as 50%, 25%, and 12.5%. On the other hand, in the lighting device 30 in this modified example, intensities of the laser beams are leveled as 10%, 40.5%, 20.25%, and 10.125%. By leveling the intensities of the respective beams, the speckle noise can be further effectively reduced. The intensities of the respective beams emitted from the lighting device 30 can be appropriately determined according to the transmissivity and reflectivity of the first and second partial reflection mirrors 31 and 33. The transmissivity and reflectivity of the first and second partial reflection mirrors 31 and 33 are preferably those capable of leveling the intensities of the emitted laser beams as much as possible.

The structure of the lighting device 30 is not limited to the structure including the two partial reflection mirrors 31 and 33, but may be a structure containing three or more partial reflection mirrors. In this case, the number of the partial reflection mirror can be increased by increasing the number of pairs of the partial reflection mirror and the rod integrator provided between the reflection mirror 18 and the ¼ wavelength plate 15 on the optical path.

Figure 6:
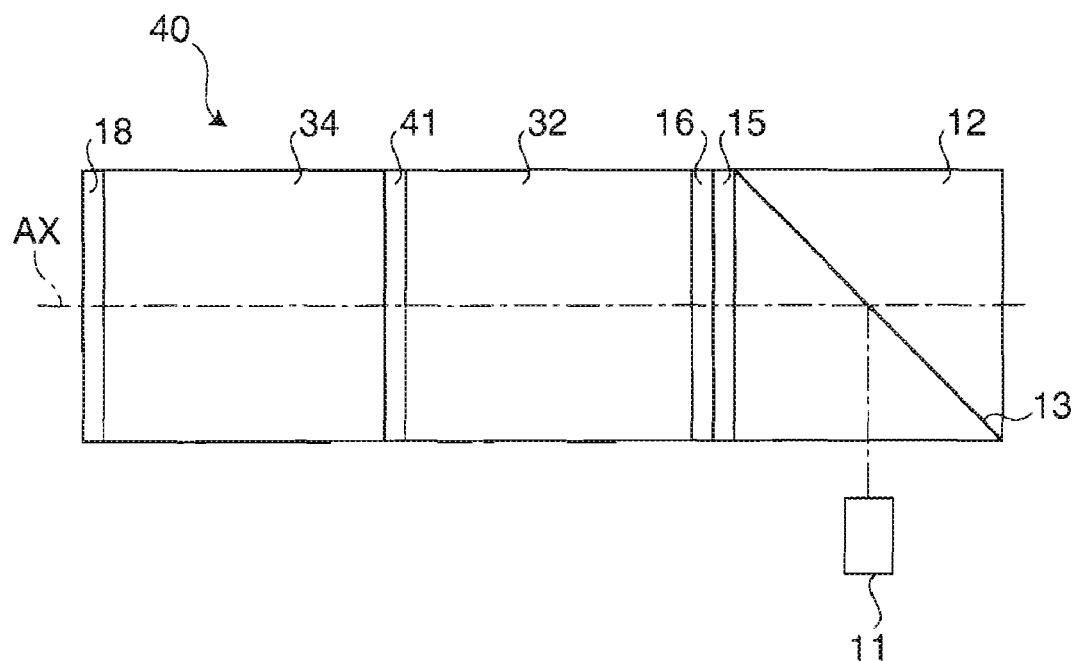
FIG. 6 schematically illustrates a structure of a lighting device according to a modified example 3 in the first embodiment

FIG. 6 schematically illustrates a structure of a lighting device 40 in a modified example 3 in this embodiment. The lighting device 40 in this modified example has a liquid crystal element 41. The liquid crystal element 41 is a variable refractive index element capable of varying refractive index. The liquid crystal element 41 is disposed between the first rod integrator 32 and the second rod integrator 34. The liquid crystal element 41 transmits laser beam which propagates between the partial reflection mirror 16 and the reflection mirror 18.

The liquid crystal element 41 has a parallel flat plate where liquid crystal molecules are dispersed. The liquid crystal element 41 varies light refractive index according to the orientation condition of the liquid crystal molecules. The liquid crystal element 41 can easily change the orientation condition of the liquid crystal molecules by controlling voltage. It is possible in this case to further vary the optical path difference of the laser beam propagating between the partial reflection mirror 16 and the reflection mirror 18 by changing the refractive index using the liquid crystal element 41. Accordingly, the speckle noise can be further effectively reduced.

Figure 7:
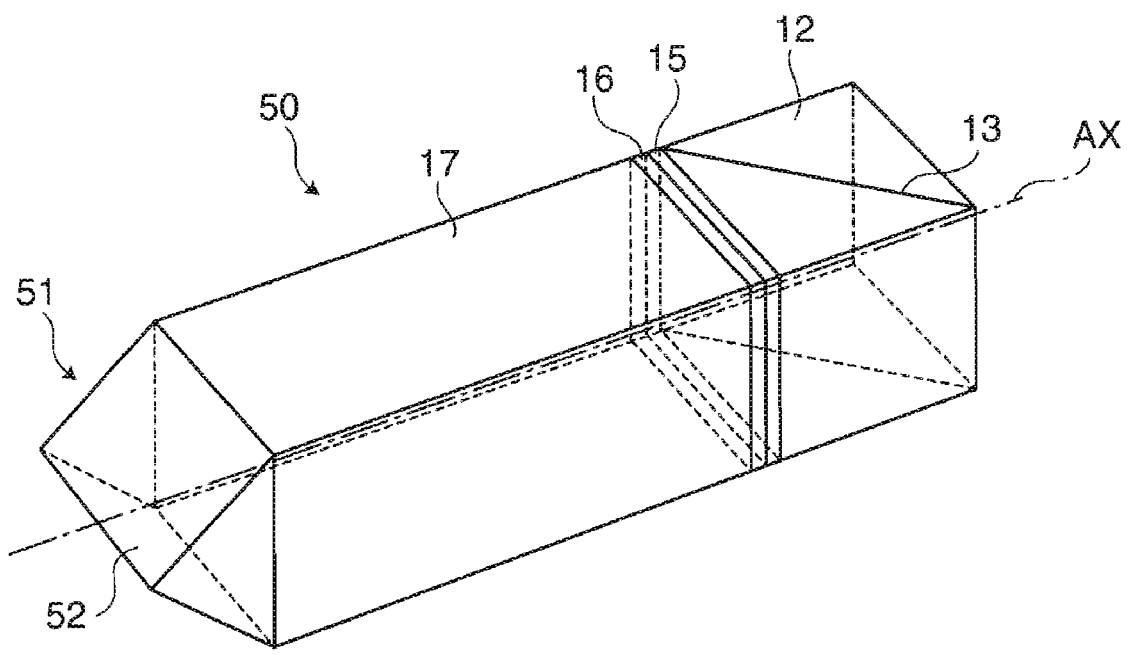
FIG. 7 is a perspective view schematically illustrating a structure of a lighting device according to a modified example 4 in the first embodiment.

FIG. 7 is a perspective view schematically showing a structure of a lighting device 50 according to a modified example 4 in this embodiment. The lighting device 50 in this modified example has a prism unit 51 as a feature of the example. The prism unit 51 has a shape of triangle pole containing right-angled triangles. The prism unit 51 is made of transparent material such as glass and resin. The prism unit 51 has two slopes 52 inclined approximately 45 degrees to the optical axis AX. The laser beam propagating within the rod integrator 17 is reflected with total reflection by the slopes 52 as the interface between the transparent material and the air. The prism unit 51 is a reflection unit which reflects light released from the polarized beam splitter 12 and advancing in the direction opposite to the lighting direction.

Figure 8:
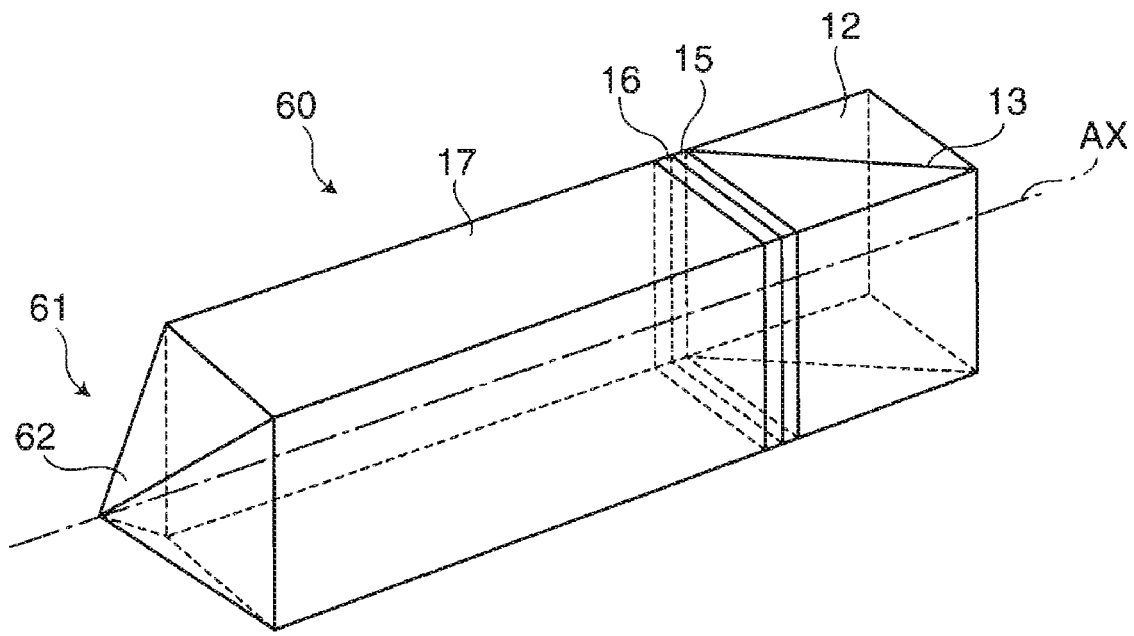
FIG. 8 illustrates a structure containing a square-pyramid-shaped prism unit.

The loss of the lease beam produced at the time of reflection can be reduced by the total reflection on the prism unit 51. Thus, light can be emitted with high efficiency. The structure of the lighting unit 51 is not limited to the structure including the triangle-pole-shaped prism unit 51. For example, a lighting unit 60 shown in FIG. 8 has a prism unit 61 having a square pyramid shape. The prism unit 61 has four slopes 62 inclined approximately 45 degrees to the optical axis AX. In case of the lighting device 60 having the square-pyramid-shaped prism unit 61, light can be similarly emitted with high efficiency. The shape of the prism unit is not limited to triangle pole shape nor square pyramid shape but may be other shapes which can reflect laser beams advancing in directions other than the lighting direction.

Second Embodiment

Figure 9:
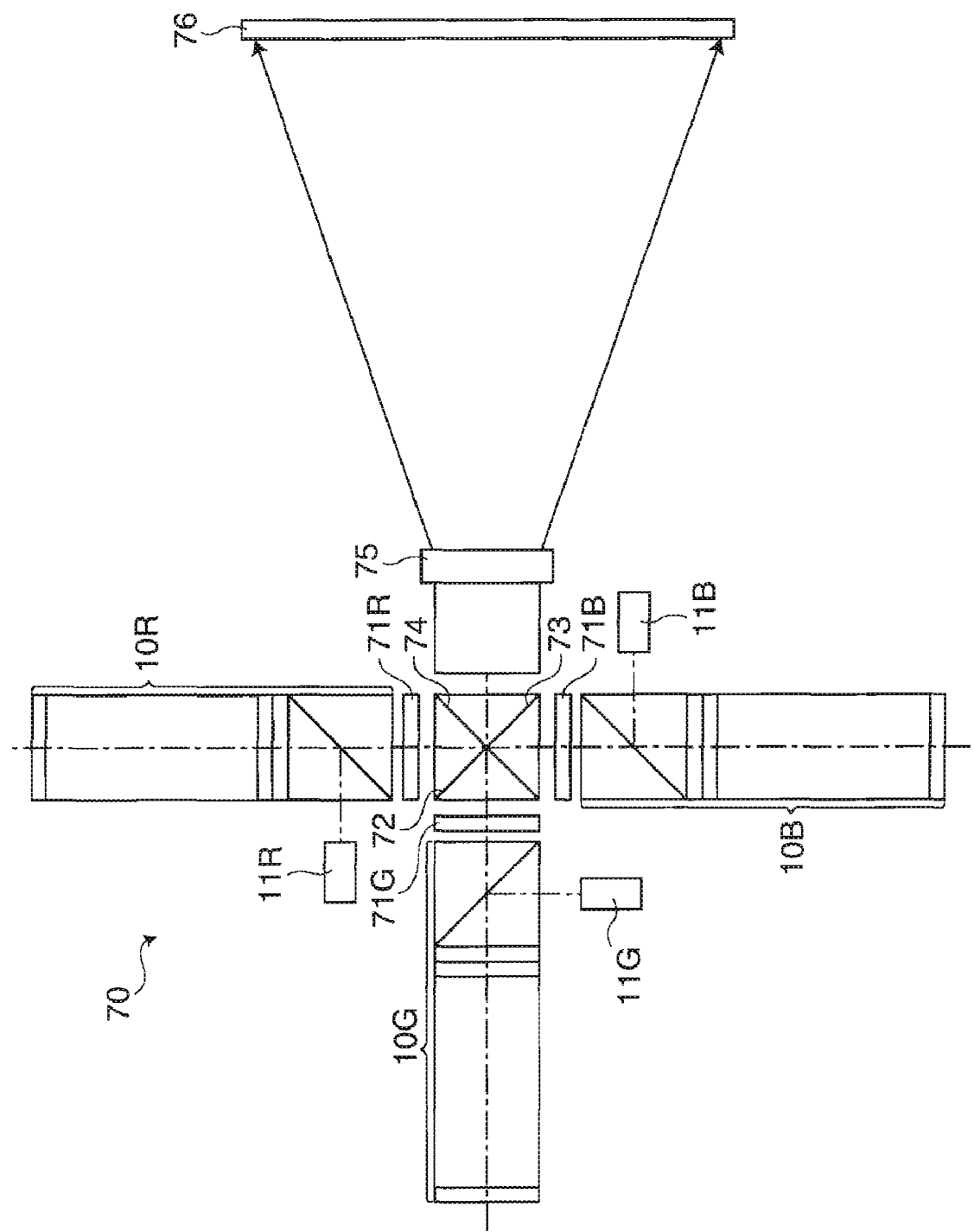
FIG. 9 schematically illustrates a structure of a projector according to a second embodiment of the invention.

FIG. 9 schematically illustrates a structure of a projector 70 according to a second embodiment of the invention. The projector 70 is a front projection type projector which supplies light to a screen 76 to display an image to be observed produced by reflected light on the screen 76. The projector 70 includes a lighting device 10R for red color (R) light, a lighting device 10G for green color (G) light, and a lighting device 10B for blue color (B) light.

The lighting device 10R for R light has a light source unit 11R for R light. The light source unit 11R for R light is a light source unit which supplies laser beam of R light. The lighting device 10G for G light has a light source unit 11G for G light. The light source unit 11G for G light is a light source unit which supplies laser beam of G light. The lighting device 10B for B light has a light source unit 11B for B light. The light source unit 11B for B light is a light source unit which supplies laser beam of B light. Each of the lighting devices 10R, 10G and 10B has the same structure as that of the lighting device 10 according to the first embodiment.

The R light emitted from the lighting device 10R for R light enters a spatial light modulating unit 71R for R light. The spatial light modulating unit 71R for R light is a transmission type liquid crystal display unit which modulates the R light emitted from the lighting device 10R for R light according to an image signal. The light modulated by the spatial light modulating unit 71R for R light enters a cross dichroic prism 72. The G light emitted from the lighting device 10G for G light enters a spatial light modulating unit 71G for G light. The spatial light modulating unit 71G for G light is a transmission type liquid crystal display unit which modulates the C light emitted from the lighting device 10G for G light according to an image signal. The light modulated by the spatial light modulating unit 71G for C light enters the cross dichroic prism 72 from a side different from the side from which the R light enters the cross dichroic prism 72.

The B light emitted from the lighting device 10B for B light enters a spatial light modulating unit 71B for B light. The spatial light modulating unit 71B for B light is a transmission type liquid crystal display unit which modulates the B light emitted from the lighting device 10B for B light according to an image signal. The light modulated by the spatial light modulating unit 71B for B light enters the cross dichroic prism 72 from a side different from the sides from which the R light and the G light enter the cross dichroic prism 72.

The cross dichroic prism 72 has two dichroic films 73 and 74 disposed in such positions as to cross each other at right angles, The first dichroic film 73 reflects R light and transmits G light and B light. The second dichroic film 74 reflects B light and transmits G light and R light. The cross dichroic prism 72 having this structure combines the R light, G light and B light modulated by the spatial light modulating units 71R, 71G and 71B. A projection lens 75 projects light produced by synthesis of the cross dichroic prism 72 onto the screen 76.

Figure 10:
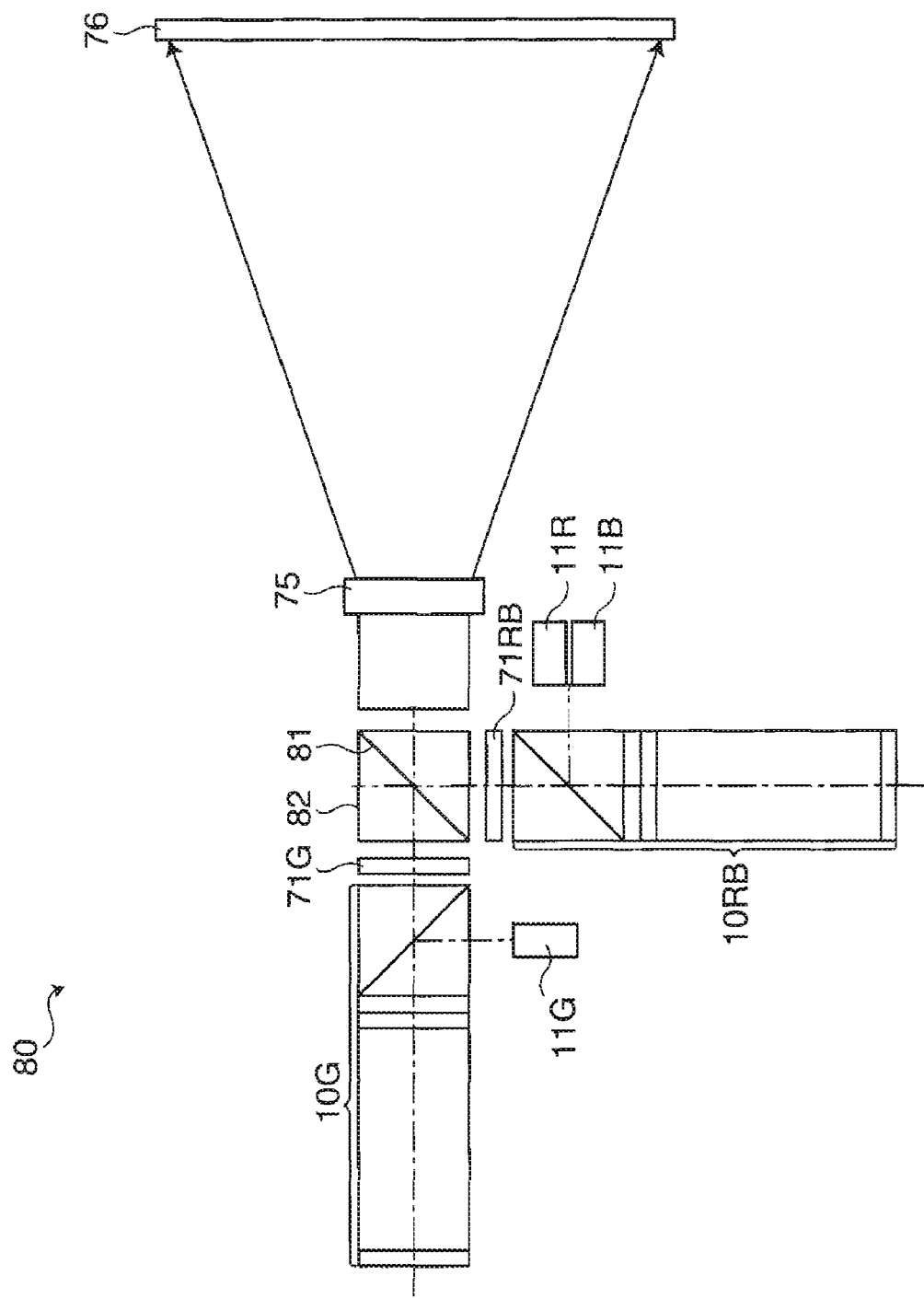
FIG. 10 illustrates a structure including two transmission type liquid crystal display units.

The structure of the projector is not limited to the structure including three transmission type liquid crystal display units. For example, the projector may include two transmission type liquid crystal display units as illustrated in FIG. 10. A projector 80 in this figure has two spatial light modulating units 71G and 71RB. The spatial light modulating unit 71RB for RB light modulates R light and B light. A dichroic prism 82 has a dichroic film 81 which transmits G light and reflects R light and B light.

The projector 80 has two lighting devices 10G and 10RB in correspondence with the spatial light modulating units. The lighting device 10RB for RB light has the light source unit 11R for R light and the light source unit 11B for B light. The lighting device 10RB for RB light sequentially turns on the light source unit 11R for R light and the light source unit 11B for B light. The spatial light modulating unit 71RB for RB light operates in synchronization with the supply of R light and B light from the lighting device 10RB for RB light. As in this case, the lighting device may include a plurality of light source units for supplying different color lights.

Furthermore, the structure of the projector may include only one transmission type liquid crystal display device. The spatial light modulating unit is not limited to the structure using the transmission type liquid crystal display unit, but may include a reflection type liquid crystal display unit (liquid crystal on silicon; LCOS). The projector may be a so-called rear projector which supplies laser beam onto one face of a screen to display an image to be observed produced by light released from the other face of the screen. The lighting device according to this embodiment of the invention is applicable not only to a projector but also to an exposing device or other devices.

Accordingly, the lighting devices according to these embodiments of the invention can be employed at the time of display of an image using coherent light.

The entire disclosure of Japanese Patent Application No. 2006-318113, filed Nov. 27, 2006 is expressly incorporated by reference herein.

What is claimed is:

1. A lighting device, comprising:
   a light source unit which supplies coherent light;
   a polarized light splitting unit which reflects first polarized light having first oscillation direction and transmits second polarized light having second oscillation direction substantially orthogonal to the first oscillation direction to split the first polarized light from the second polarized light;
   a reflection unit which reflects light advancing in a direction other than the lighting direction from the polarized light splitting unit;
   a partial reflection unit disposed between the polarized light slitting unit and the reflection unit to transmit a part of entering light and reflect the other part of the entering light; and
   a wavelength plate disposed between the polarized light splitting unit and the partial reflection unit to vary polarization condition of entering light.

2. The lighting device according to claim 1, wherein the partial reflection unit and the reflection unit are disposed with a distance corresponding to half of a coherent length of the coherent light or longer between the partial reflection unit and the reflection unit.

3. The lighting device according to claim 1, wherein the polarized light splitting unit and the reflection unit are disposed on a common optical axis.

4. The lighting device according to claim 1, further including a light guide unit through which light propagates between the partial reflection unit and the reflection unit.

5. The lighting device according to claim 4, wherein the light guide unit has a rod integrator.

6. The lighting device according to claim 1, further including a variable refractive index element which transmits light propagating between the partial reflection unit and the reflection unit and varies refractive index.

7. The lighting device according to claim 1, further including the plural partial reflection units.

8. The lighting device according to claim 1, wherein the reflection unit has a prism unit which reflects light with total reflection.

9. A projector, comprising:
   the lighting device according to claim 1; and
   a spatial light modulating unit which modulates light emitted from the lighting device according to an image signal.

* * * * *